United States Patent [19]

Ezis et al.

[11] Patent Number: 4,848,984

[45] Date of Patent: Jul. 18, 1989

[54] METHOD OF MAKING REACTION BONDED/HOT PRESSED SI$_3$N$_4$ FOR USE AS A CUTTING TOOL

[75] Inventors: Andre Ezis, Grosse Ile; Elaine C. Beckwith, Riverview, both of Mich.

[73] Assignee: Ceradyne, Inc., Costa Mesa, Calif.

[21] Appl. No.: 652,410

[22] Filed: Sep. 20, 1984

Related U.S. Application Data

[63] Continuation-in-part of Ser. No. 444,251, Sep. 30, 1982, abandoned.

[51] Int. Cl.$^4$ .............................................. C04B 35/58
[52] U.S. Cl. ...................................... 51/309; 264/65; 264/332; 264/325; 501/97
[58] Field of Search ................. 264/65, 332, 325; 501/97; 51/309

[56] References Cited

U.S. PATENT DOCUMENTS

| | | | |
|---|---|---|---|
| 3,839,540 | 10/1974 | Arrol et al. | 423/344 |
| 4,351,787 | 9/1982 | Martinengo et al. | 264/65 |
| 4,401,617 | 8/1983 | Ezis et al. | 264/332 |
| 4,440,707 | 4/1984 | Shimamori et al. | 264/65 |

Primary Examiner—James Derrington
Attorney, Agent, or Firm—Leonard Tachner

[57] ABSTRACT

A method of making a reaction bonded/hot pressed silicon nitride comprising object is disclosed. Second phase crystallites are formed prior to hot pressing. A mixture of silicon, SiO$_2$, and 0.4–2.3 molar percent (by weight of the silicon) of oxygen carrying agents, i.e., Y$_2$O$_3$ and Al$_2$O$_3$, is performed and reaction nitrided to form discs or billets having at least 60% alpha Si$_3$N$_4$ and a high proportion of second phase crystallites which displace substantially all silicate glass except for a controlled small quantity. The reactive amounts of Y$_2$O$_3$, Al$_2$O$_3$ and SiO$_2$ are controlled to assure formation of substantially Y$_1$SiO$_2$N as the second phase crystallite. Al$_2$O$_3$ is controlled in an amount of 0.4–4% by weight to ensure that the small proportion of glass serves to protect the oxynitrides against linear oxidation kinetics. The hot pressed material has no visual mottle porosity associated therewith.

44 Claims, 3 Drawing Sheets

METHOD OF MAKING REACTION BONDED/HOT PRESSED $Si_3N_4$ FOR USE AS A CUTTING TOOL

RELATED APPLICATIONS

This is a continuation-in-part application of U.S. application Ser. No. 444,251, filed Sept. 30, 1982 and now abandoned.

BACKGROUND OF INVENTION AND PRIOR ART STATEMENT $Si_3N_4$ has been known as a ceramic since 1857, but its structure was not determined with any degree of certainty until the 1950's. Useful objects have been fabricated from this ceramic by essentially two methods or arts: (1) hot pressing $Si_3N_4$ powder mixed with pressing aids, or (2) reaction bonding silicon powder mixed with a catalyst by heating in nitrogen to be followed by densification. The two modes were combined U.S. Pat. No. 3,839,540, permitting pressing aids to be added to silicon prior to reaction bonding heating.

In the hot pressing art, pressing aid additives were deemed necessary because pure $Si_3N_4$ is almost unsinterable, even under pressure. Typically, such aids have included the oxides of Mg, Y, Ce, Fe, Ca, Cr, Zr, Zn, Be, Al and selected rare earths (see U.S. Pat. Nos. 3,830,652; 4,304,576; 3,903,230; 3,839,540; 4,046,580; 4,234,343; 4,202,698; and 4,038,092). The pressing aids function as a means to flux the fusion or densification of the $Si_3N_4$ powder during hot pressing by the formation of a liquid. Unfortunately, such liquid more readily forms a type of glassy or amorphous phase in the final product, which inhibits high temperature physical properties of the ceramic and reduces the life of a cutting tool made from this material. This is exemplified clearly by U.S. Pat. No. 3,839,540, which discloses a typical method of mixing silicon with a glass forming oxide (MgO), nitriding the mixture, and hot pressing at a high temperature of 1700°-1750° C. (see column 3, line 6 and column 4, line 30).

With this teaching, a variety of glass compounds in the nitrided body present an indefinite melting temperature range for the flux since each glass compound will have its own high melting range. As a result, the temperature for melting all of the glass species is very high, requiring 1700°-1750° C. to achieve, at best, a relatively low densification of 2.7-3.2 gm/cc. Under the conditions of the hot pressing art, the mixture does not form phases which crystallize upon cooling from hot pressing conditions. There is a need to modify the mixture prior to hot pressing to avoid a gross glassy phase.

There has been little recognition in the hot pressing art of the role played by the formation of a glassy as opposed to a crystalline intergranular phase with respect to tool wear. Tool wear consists of two components: the mechanical component and the chemical component. The mechanical component is a function of physical microstructure, for example, the grain size and the grain size distribution. The chemical component is a function of the chemical reaction of the intergranular phase as, for example, glassy or crystalline, or the chemical type of crystalline phase. Investigators of hot detected the presence of various hot pressed $Si_3N_4$ have crystalline phases (e.g., oxynitrides) without understanding their significance or the interrelationship of the crystalline phase to ceramic tool life and performance. Also, there has been little recognition of the role played by the retention of a small, controlled quantity of the glassy phase in protecting the crystalline phase, such as an oxynitride, against high temperature oxidation. In fact, the prior art has generally followed the axiom that adding oxygen to a powder system for forming a ceramic by nitriding will be detrimental and thus has taught in a direction away from that of this invention.

In the reaction bonding art, oxides of aluminum have been mixed with silicon powder to promote a sialon product as a result of nitriding, see U.S. Pat. No. 4,038,092 and the article by K. H. Jack and W. J. Wilson, "Ceramics Based on the Si-Al-O-N and Related Systems", Nature (London) Physical Science, 233 (80) 25–29 (1972). Oxides of yttrium have been added to silicon powder prior to nitriding to promote subsequent sintering (see U.S. Pat. No. 4,285,895), or added to silicon nitride formed by the reaction of Si, $Al_2O_3$, and $N_2$ for the purpose of facilitating sintering (see U.S. Pat. No. 4,184,884). However, users of $Al_2O_3$ or $Y_2O_3$ in such reaction bonding techniques again have failed to recognize the role that can be played by the formation of certain second phases, particularly silicon oxynitrides, derived from the additives as a displacement for the glass phase.

This lack of understanding is evident particularly in U.S. Pat. No. 4,285,895, wherein it is stated that a chemical analysis of the nitrided body exhibited 91% $Si_3N_4$ and 9% $Y_2O_3$; the phase composition was stated to be predominantly alpha silicon nitride with minor phases of beta silicon nitride along with a yttrium, silicon, oxygen, nitrogen phase (see column 6, lines 1–6). However, no distinction was made as to the type of phase, crystalline or glass, or even, if assumed crystalline, which particular oxynitride or complex oxide was present. The second phase most likely was a glass because the disclosure requires that sintering be carried out at a very high temperature, 1925° C., one which is only necessary to decrease the viscosity of the glass to allow for sufficient mass transport or atomic mobility to effect densification. Most likely the glasses were formed because the densification aid (MgO or $Y_2O_3$) was impregnated into the nitrided body and thus was reacted under high sintering temperature conditions (see column 4, lines 7–9). This patent failed to provide for the production of crystallites during nitriding and failed to recognize the role played by a controlled quantity of glassy phase that can be effective in protecting crystallites, if formed, against high temperature oxidation. The generation of the right crystallite, i.e., an oxynitride, encapsulated by a controlled glassy layer, can increase tool life by an increase in hardness and chemical stability and provide greater microstructure uniformity as demonstrated herein. U.S. Pat. No. 4,285,895 exhibited room temperature strength levels of 60,000–77,000 psi as opposed to 100,000–140,000 realized herein.

This disclosure is concerned with the additives that must be selected and used in reactive amounts and under conditions that result in the formation of desirable second phase crystallites, advantageously accompanied by a small glass envelope; of particular interest is the use of $Y_2O_3$ and $Al_2O_3$. The mere use of ingredients similar to that of this invention does not ensure the total formation of crystallites, but such goal is dependent upon proper ingredient proportioning and treatment prior to heating for densification as well as treatment during densification heating to form optimum second phase crystallites which are required in the final product to provide quality benefits for machining applications. The formation of the desired second phase crystallite will provide uniform melting of the second phase, will lower the hot pressing temperature, and reduce the hot pressing time. This will in turn result in a uniform microstructure with no visual "mottle-porosity" appearance.

INVENTION SUMMARY

The invention is first a method of making a silicon nitride comprising object having resistance to oxidation at high temperatures, such object containing a desired second phase crystallite encapsulated by a controlled glassy film. The encapsulated desired second phase crystallite increases the wear resistance of the material when used as a cutting tool material.

The method comprises the steps of: (a) forming a compact from a mixture of silicon, an oxynitride forming agent, and a glass forming agent, said oxynitride forming agent and glass forming agent together being present in said mixture in amounts to substantially fully react said silicon upon heating in nitrogen to convert the compact to essentially $Si_3N_4$ and oxynitride crystallites encapsulated by a glass film; (b) heating the compact in a nitriding atmosphere, without the use of pressure normally associated with hot pressing, to produce said converted compact, said converted compact having a size greater than and a density less than the final object to be formed; and (c) hot pressing the body at a temperature equal to or less than 1670° C. to produce a $Si_3N_4$ comprising object, of required dimension and density, useful for a cutting tool and consisting essentially of the chemistry in said converted compact.

The inventive method significantly reduces the formation of glass as a second phase in the $Si_3N_4$ product, reserving the glass only as a crystallite encapsulating film. The normal amount of glass is displaced by crystallites formed or introduced, for the first time, prior to hot pressing, as a result of the full reaction of available silicon and an effective amount of crystallite forming agents. The combination of $Si_3N_4$ and desired encapsulated second phase crystallites (a) reduces the wear rate of the resulting object when used as a cutting tool; (b) increases the high temperature stability of the object; and (c) achieves considerable processing economy by lowering the required hot pressing temperature and time, and removes mixture proportion limitations normally imposed by lower viscosity requirements for powder in hot pressing.

The mixture is preferably comprised of Si, $SiO_2$, and the silicon oxynitride and glass forming agents. $SiO_2$ is present as a surface oxide on the starting silicon powder and it may also be introduced into the mixture as an additional oxide surface coating on the silicon as a result of milling the mixture. $SiO_2$ should be present in an amount of 1–3% by weight of the silicon to provide for proper silicon nitride and silicon oxynitride formation.

The silicon oxynitride forming agent is optimally $Y_2O_3$ in an amount of 3–19% by weight of the silicon in the mixture, but can be other rare earth oxides such as $HfO_2$, $Gd_2O_3$, $La_2O_3$, or $Sc_2O_3$. The silicon oxynitride forming agent can be present in a molar percent of silicon in the range of 0.4–2.4. The silicon oxynitride crystallite accordingly will be formed in an amount of 2.9–14.4% by weight of the converted compact (or nitrided body) which remains essentially the same in the hot pressed object. Some zirconium oxide can be substituted for some of the rare earth oxide to comprise the silicon oxynitride forming agent which, in combination, will facilitate the formation of the crystallites.

The glass forming agent is optimally $Al_2O_3$ in an amount of 0.4–5.0% by weight of the Si in the mixture; the amount is restricted because it reacts with a source of silicon ($SiO_2$ or $Si_3N_4$) and rare earth oxide to form a limited silicate film. However, other glass formers may be used, such as MgO, $Fe_2O_3$, CaO, $Cr_2O_3$, etc., but is limited to an amount of 0.4–1%. The glass forming agent is important because it provides for a crystallite encapsulating film (4–10 angstroms thick) which reduces the transport of oxygen so detrimental to crystallites when the ceramic is used as a cutting tool in an oxygen-containing environment.

The silicon base powder is selected to be 98% pure or more with less than 1.5% by weight metal contaminants and less than 0.05% by weight carbon.

Figure 2:
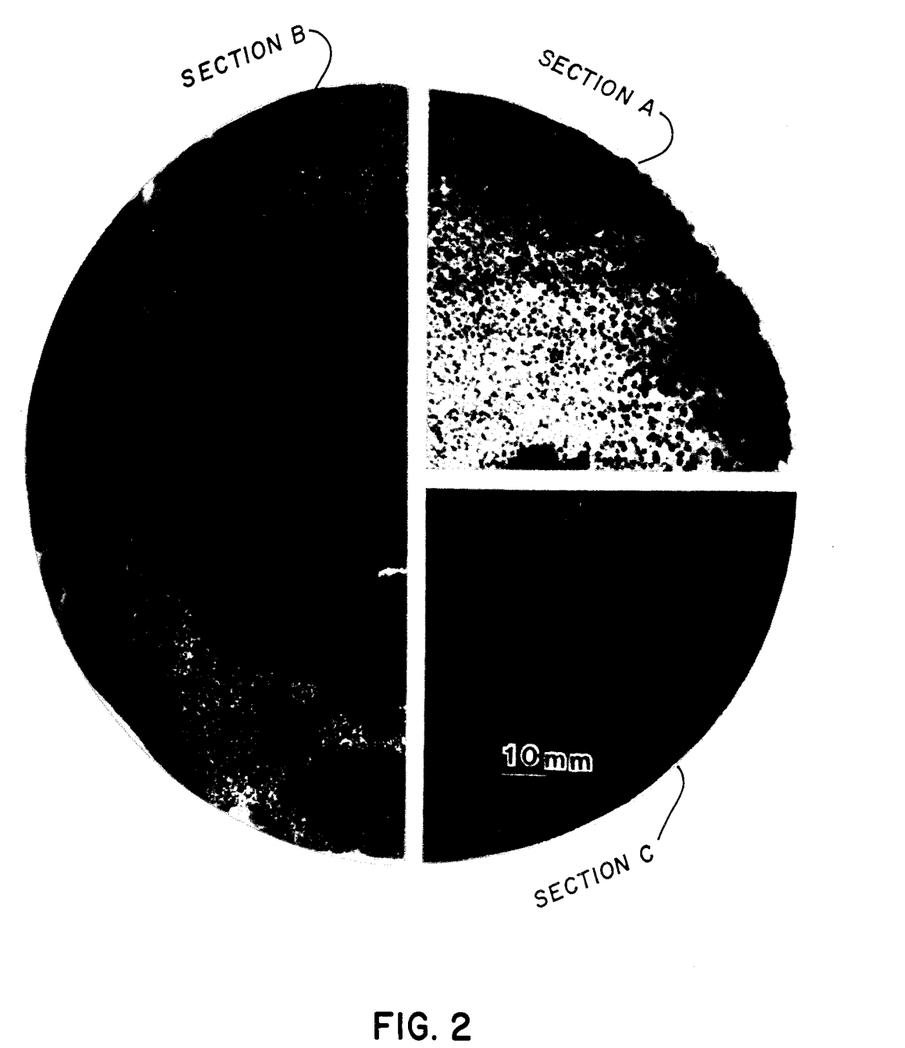
FIG. 2 is a photograph showing an inhomogeneous appearance due to visual microporosity in silicon nitride prepared in accordance with prior art methods (Sections A and B) and the uniform appearance, showing no visual microporosity, in the material of this invention (Section C).

Proportioning the mixture to form the second phase crystallite, preferably $Y_1SiO_2N$, causes the microstructure to be free (Section C of FIG. 2) of the visual mottle microporosity which is apparent when mixed phases of $Y_{10}$ and $Y_2$ are present (see Sections A and B of FIG. 2). The Y phase is the optimum phase for development of the minimum chemical component of wear; other oxynitride phases ($Y_{10}$ or $Y_2$) have been shown to be slightly less effective than $Y_1$ to increase this component. In addition, the nitriding cycle and level of hot pressing temperature affect the formation of $Y_1SiO_2N$ phase. The Y phase, when formed as a result of nitriding, permits somewhat lower nitriding temperatures to be used and remains in the stable Y phase through the hot pressing cycle which again can be at lower temperatures.

The nitriding cycle should be designed to keep the starting composition of the nitriding gas substantially constant and an exothermic reaction should be minimized as much as possible. The nitriding reaction should be designed to convert as much of the silicon to $Si_3N_4$ as possible, i.e., 99.5%, and of that amount at least 60% is in the alpha form. The hot pressing temperature should be designed to obtain substantially all beta $Si_3N_4$ conversion, beta $Si_3N_4$ producing a better knitted structure with better strength; preferably, this is about 1650° C.

Optimally, the oxygen carrying agent/$SiO_2$ weight ratio is maintained at 1.1–6.4. Controlling the ratio of $Y_2O_3/SiO_2$ desirably eliminates production of the N-melilite phase ($Y_2O_3 \cdot Si_3N_4$) and results in a density in said body of at least 1.57 gm/cm³. The purity of the starting $Y_2O_3$ and $Al_2O_3$ is advantageously selected to be at or above 99.99% and 99.5%, respectively. A desirable average particle size for the mixture is obtained by milling so that at least 50% of the mixture is about 4.0 microns or less.

Heating to nitride preferably is carried out with a nitrogen demand cycle to an ultimate temperature of 1090°–1430° C. (2000°–2600° F., preferably 2560° F.) for a time sufficient to produce a body consisting essentially of silicon nitride (preferably at least 60% by weight in the alpha form), 2.9–14.4% by weight second phase crystallites, i.e., yttrium silicon oxynitride (preferably the $Y_1SiO_2N$ phase), and the remainder refractory silicate, free silicon, and unreacted $Y_2O_3$. The nitrided body is preferably characterized by a density of 1.57–2.78 gm/cm³.

Hot pressing is advantageously carried out in an inert atmosphere (in a carbonaceous vessel) at an ultimate pressing temperature equal to or less than 1670° C., optimally 1370°–1650° C. (2500°–3000° F.), under an ultimate pressure of 3600–3700 psi and for a period of 0.25–3.0 hours. The compression ratio is substantially reduced to 1.2:1 to 2.1:1.

The resulting hot pressed object is preferably characterized by the silicon nitride being substantially in the beta form and no visual mottle porosity, and the desired silicon oxynitride phase is enveloped by a silicate-containing glass in a thickness of 4–10 angstroms. The object preferably possesses a hardness of 88.5–90.5 on the 45-N scale, a density of 3.2–3.4 gm/cm$^3$, a fracture strength of about 85,000 psi at 1200° C. in air in a 4-point bend test, and an oxidation resistance that prevents weight pickup by the object after 450 hours in air at 1000° C.

SUMMARY OF THE DRAWINGS

FIG. 3 is a series of graphical illustrations of tool flank wear as a function of speed comparing the improved wear characteristics of this invention with the prior art silicon nitride product.

FIG. 3b illustrates the mechanical component of total wear as a function of speed. Curve A is a wear curve generated in an inert atmosphere of a product made by this invention with fine microstructure control. Curve C is the wear curve generated in an inert atmosphere of a prior art silicon nitride product with a coarse microstructure illustrating the higher wear characteristics of the mechanical component.

FIG. 3c illustrates the effect of an oxidizing atmosphere on the chemical component of total wear. Curve D is a wear curve generated in an oxygen-rich atmosphere for a prior art silicon nitride product. Curve E is a wear curve generated in an oxygen-rich atmosphere for a product of this invention with fine microstructure but with a mixed $Y_{10}$ and N intergranular phase. Curve B is a wear curve generated in an oxygen-rich atmosphere of a product of this invention with fine microstructure but with the desired Y intergranular phase.

DETAILED SPECIFICATION

A preferred method for making a silicon nitride comprising object according to this invention is as follows.

1. Forming a Powder Compact

A mixture of powdered silicon, $SiO_2$, and reactive oxygen carrying powder agents is prepared and milled. The reactive oxygen carrying powder agents comprise a silicon oxynitride or crystallite forming agent and a glass forming agent. The crystallite or oxynitride forming agent is one which forms second phase crystallites, particularly silicon oxynitrides, when reacted with the silicon or silicon nitride under a heated nitrogen atmosphere.

$SiO_2$ is present as a surface oxide on the starting silicon powder and it may also be introduced into the mixture as an additional oxide surface coating on the silicon as a result of milling the mixture. $SiO_2$ should be present in an amount of 1–3% by weight of the silicon to provide for proper silicon nitride and silicon oxynitride formation.

The silicon oxynitride forming agent is optimally $Y_2O_3$ in an amount of 3–19% by weight of the silicon in the silicon mixture (3.2→15.60% by weight of mixture), but can be other rare earth oxides such as $HfO_2$, $Gd_2O_3$, $La_2O_3$, or $Sc_2O_3$. The silicon oxynitride forming agent can be present in a molar percent of silicon in the range of 0.4–2.4. The silicon oxynitride crystallite accordingly will be formed in an amount of 2.9–14.4% by weight of the converted compact (or nitrided body) which remains essentially the same in the hot pressed object. Some zirconium oxide can be substituted for some of the rare earth oxide to comprise the silicon oxynitride forming agent which, in combination, will facilitate the formation of the crystallites.

The glass forming agent is optimally $Al_2O_3$ in an amount of 0.4–5.0% by weight of the silicon in the silicon mixture; the amount is restricted because it reacts with the $SiO_2$ and rare earth oxide to form a limited silicate film. However, other glass formers may be used, such as MgO, $Fe_2O_3$, CaO, $Cr_2O_3$, etc., but must be limited to an amount of 0.4–1%. The glass forming agent is important because it provides for a crystallite encapsulating film (4–10 angstroms thick) which reduces the transport of oxygen so detrimental to crystallites when the ceramic is used as a cutting tool in an oxygen-containing environment.

Use of the oxynitride forming agent and glass forming agent in the amounts herein will improve physical characteristics and formation of a second phase crystallite which (a) will uniformly be dispersed; and (b) substantially displace the gross amount of detrimental glassy silicate phase, normally formed, to leave a controlled and limited amount of the latter. Use of critical amounts of $Y_2O_3$ and $Al_2O_3$ in combination will provide additional improvements, including: (a) formation of the $Y_1SiO_2N$ as the predominant silicon oxynitride phase resulting from nitriding, permitting much lower hot pressing temperatures and shorter hot pressing times leading to increased economy; and (b) formation of a critically small amount of a protective amorphous glassy silicate coating the oxynitride crystallite which is effective to prevent high temperature oxidation of the crystallite during high temperature cutting tool use.

For purposes of the preferred method, a uniform powder mixture is prepared with 2000 grams silicon (86.6 weight percent of the mixture, 278 grams $Y_2O_3$ (12 weight percent of mixture and 13.9% of silicon), and 32 grams Al$_2$O$_3$ (1.4 weight percent of mixture and 1.6 of silicon). The usable range for the oxygen carrying agents is 0.4–2.3 molar percent of the mixture and <0.42–2.4 molar percent of silicon. Y$_2$O$_3$ is normally used in the range of 3.19% by weight of the silicon and 3.2–15.6% by weight of the mixture. The glass forming oxide, such as Al$_2$O$_3$, is used in a range of 0.4–5% by weight of the silicon, 0.4–4.0% by weight of the mixture. SiO$_2$ is present usually as an oxide on the silicon powder and increased to 1–3% by weight of the silicon by milling.

Silicon is selected to have 98% or greater purity and a starting average particle size of 8–9.2 microns. The major trace metal contaminants experienced with such purity include, as a maximum: Fe - 1.0%, Al - 0.5%, and Mn - 0.09%. Nonmetallic contaminants include, as a maximum: carbon - 0.05%, and O$_2$ - less than 0.5%. Yttria is selected to have a purity of at least 99.99% with an average crystal size of 0.0438 microns (438 Å). Alumina is selected to have a purity of at least 99.5% with an average particle size of 0.3–0.5 microns.

The mixture is comminuted and blended by being charged into an inert milling jar along with grinding media, preferably in the form of Burundum cylinders (85% Al$_2$O$_3$ and 11% SiO$_2$, 2% MgO, 1.2% CaO, 0.8% of [TiO$_2$, Fe$_2$O$_3$, Na$_2$O, K$_2$O], and milled for 48 hours at 64 rpm. The mixture is then separated from the media by use of a #10 mesh screen. The milling is preferably dry but can be wet with some accompanying disadvantages. The oxygen carrying agents must be in a reactive form with a high surface area and small crystalline size. The resulting milled mixture will have at least 50% with an average particle size of about 4 microns.

The oxygen level after milling in air will be increased to about 1.6 weight percent of the silicon and be present as an oxide coating on the silicon in an amount of about 3.0 weight percent. The ratio of oxynitride forming agent/SiO$_2$, such as Y$_2$O$_3$/SiO$_2$, is controlled to be in the range of 1.1–6.4, preferably about 4.

A measured quantity of the milled mixture is loaded into a cold press die arrangement and pressed at ambient conditions by use of 1400–1500 psi to form a compact of a size about 6 inches by 0.6 inch and a density of 1.1–1.4 gm/cm$^3$.

2. Heating to Nitride

The compact is heated in a nitriding atmosphere, without the use of pressure normally associated with hot pressing, to produce a silicon nitride comprising body consisting of Si$_3$N$_4$, second phase crystallite, or silicon yttrium oxynitride (particularly YSiO$_2$N), 0.2–1% silicate (by weight of the body) present as a glassy envelope encapsulating the oxynitride crystallite, and up to 0.5% by weight of free silicon and unreacted oxygen carrying agents (here Y$_2$O$_3$ and Al$_2$O$_3$) The body will have a size greater than and a density less than the object to be formed.

The formation of rare earth silicon oxynitrides is brought about by heating a mixture of stoichiometric amounts of the rare earth oxide, SiO$_2$, and Si$_3$N$_4$ (or Si that has been converted to Si$_3$N$_4$ in situ) to a reaction temperature and for sufficient time in a nitrogen atmosphere. Silicon oxynitrides are regularly considered and identified as crystalline substances; four types of silicon oxynitrides, which can be formed as a result of heating Y$_2$O$_3$, SiO$_2$ and Si$_3$N$_4$ in a nitrogen atmosphere, are: (Y$_{10}$Si$_6$O$_{24}$N$_6$ (Y$_{10}$ phase); YSiO$_2$N (Y phase); (Y$_4$Si-O$_2$O$_7$N$_6$ (Y$_4$ phase); and Y$_2$Si$_3$O$_3$N$_4$ (N phase). Stoichiometric amounts of the ingredients for each of such oxynitrides would respectively be 10/9/1 for the Y$_{10}$ phase, 2/1/1 for the Y phase, 4/1/1 for the Y$_4$ phase, and 1/0/1 for the N phase. The reaction temperature and short time kinetics for making the Y$_{10}$ phase is respectively 1500°–1550° C. and about six hours, and for the Y phase it is 1600°–1650° C. for a period of about six hours. However, under nitriding conditions, the heating cycle is designed to primarily form Si$_3$N$_4$ and should not exceed 1427° C. as indicated below; the crystallite phases will still form because the chemical conversion is over a longer period of time, several days up to 10 days, then is gas phase reactions, permitting the conversion of mixture to Si$_3$N$_4$ and crystallite phases to take place at lower temperatures. For example, the following kinetic reaction may take place: 6 Si (gas)+4 2N$_2$ (gas)+2 Y$_2$O$_3$ (solid)+SiO$_2$ (solid)→Y$_1$ phase+Si$_3$N$_4$.

To carry out the heating for nitriding, the compact is placed in an enclosed furnace, preferably evacuated to a pressure of less than 1 micron, and heated at a fast rate to 1200° F. (649° C.). The furnace is then filled with a gaseous mixture consisting of 72% by weight nitrogen, 3% hydrogen, and 25% helium at a pressure of about 2.7 psig. The total O$_2$ and H$_2$O content in such gaseous mixture is less than 4 ppm. The temperature of the furnace is then increased, in steps, to: 1200°–1700° F. at 500° F./hr, to 1700°–2000° F. at 200° F./hr (111° C./hr), and to an initial nitriding temperature of 2000°–2600° F. (1093°–1427° C.) at a slower rate. A nitrogen demand sequence is used wherein the nitrogen content of the furnace atmosphere is monitored and fresh nitrogen only is intermittently supplied to the furnace to replace the nitrogen consumed in forming Si$_3$N$_4$ and any oxynitride. Nitrogen is added when the pressure drops below 2.4 psig and is continuously injected until the pressure is brought back up to maximum pressure of 2.7 psig. The temperature is held constant while replenishment is taking place, but is increased when the pressure remains above 2.4 psig for a predetermined time. The ultimate nitriding temperature is important and is not to exceed 2600° F. (1427° C.) in order to obtain complete conversion of silicon to silicon nitride. If the temperature range is exceeded, silicon may be melted, allowing for unreacted silicon. The time of the cycle is also important and is terminated when there is little or no further nitrogen demand. If such time is not reached, unreacted Y$_2$O$_3$ and Si may remain. When the nitriding cycle is completed, i.e., the system does not require additional nitrogen, the material is cooled to room temperature at a rate of 250° F./hr (56° C./hr).

The nitrided body will preferably consist of silicon nitride (at least 60% of which is in the alpha form), 3–15% silicon yttrium oxynitride in the Y$_1$SiO$_2$N phase, 0.2–1% of an encapsulating glass (which may be theorized to be yttrium aluminum silicate), and up to 0.5% of silicon and unreacted Y$_2$O$_3$. Some trace amounts of other phases, such as the Y$_{10}$Si$_6$O$_{24}$N$_2$ phase, may be present. The body will have a density of at least 1.57 gm/cm$^3$. The minimum alpha/beta Si$_3$N$_4$ ratio is 1.5. This body is an intermediate product or commodity that has independent utility as a starting block for other shaping techniques, one of which is hot pressing.

3. Hot Pressing

The nitrided body is hot pressed at a temperature of 1670° C. or less to produce a silicon nitride comprising object of required dimension and density. A pressing fixture having graphite walls is used to carry out hot pressing. The walls and nitrided body are both coated with a slurry of boron nitride and dried. The pressing fixture with the nitrided body therein is placed in the hot pressing furnace. The heating and pressing is carried out preferably in increments: (1) a mechanical loading of 100 psi is applied at room temperature to the body; (2) temperature is increased to 1800° F. (982° C.) and pressure increased to 500 psi; (3) the temperature is then increased to 2500° F. (1371° C.) and pressure increased to 2500 psi; (4) the temperature is finally increased to the hot pressing temperature of 3000° F. (1649° C.) and pressure increased to 3700 psi, the latter conditions being maintained until at least 99% or desirably 99.5% of theoretical full density is achieved; this usually requires 0.25–3.0 hours at the hot pressing temperature. The object is then cooled at any rate, even quenched, to room temperature. The hot pressing temperature advantageously is in the range of 1200°–1650° C. and optimally 1371°–1649° C. (200°–3000° F.); the environment in the pressing fixture is essentially inert due to the carbon walls and the ultimate pressing pressure is preferably in the range of 3600–3800 psi.

The resulting object will consist essentially of beta silicon nitride having no visual mottle microporosity, 2.9–14.4% by weight silicon oxynitride ($Y_1SiO_2N$) enveloped by a silicate glassy phase having a thickness of 4–10 angstroms. The object preferably possesses a hardness of 88.5–90.5 on the 45-N scale, a density of 3.2–3.3 $gm/cm^3$, a fracture strength of about 85,000 psi at 1200° C. in a 4-point bend test, and an oxidation resistance that prevents weight pickup by the object after 450 hours in air at 1000° C.

Figure 3A:
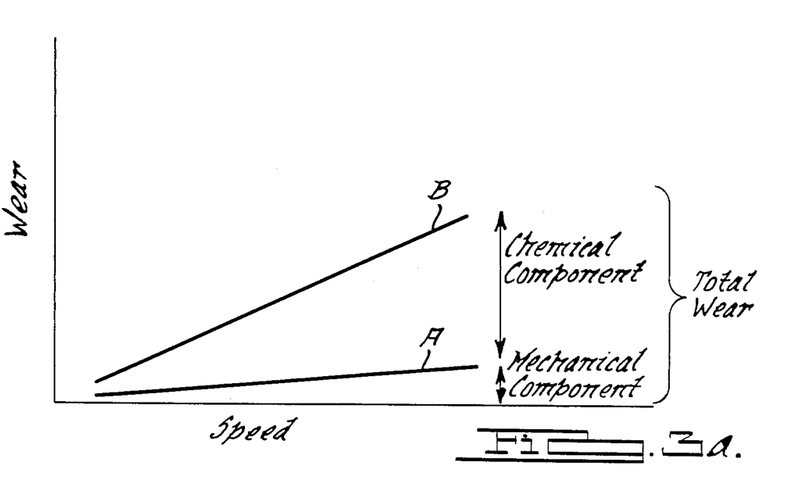
FIG. 3a illustrates the mechanical and chemical component of total wear as a function of speed. Curve A is the wear curve generated in an inert atmosphere of a product made by this invention illustrating the mechanical component (microstructure control) of the total wear. Curve B is the wear curve generated in an oxidizing atmosphere of a product made by this invention illustrating total wear (chemical and mechanical component) characteristics.
Figure 3B:
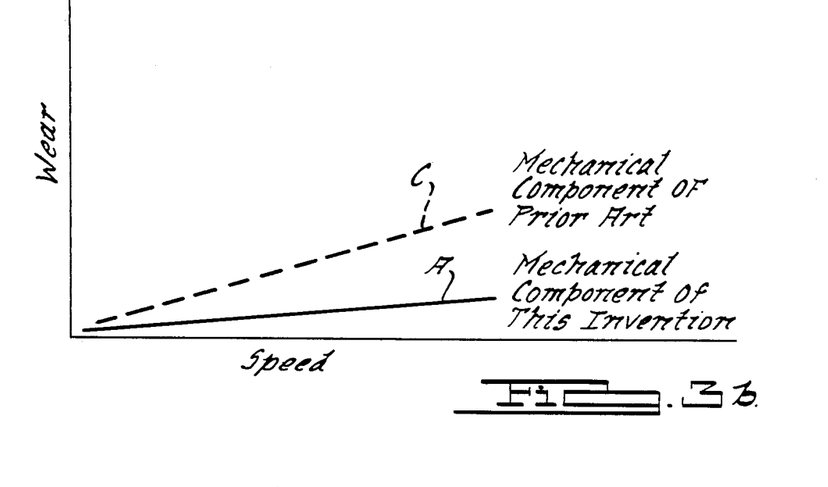
Figure 3C:
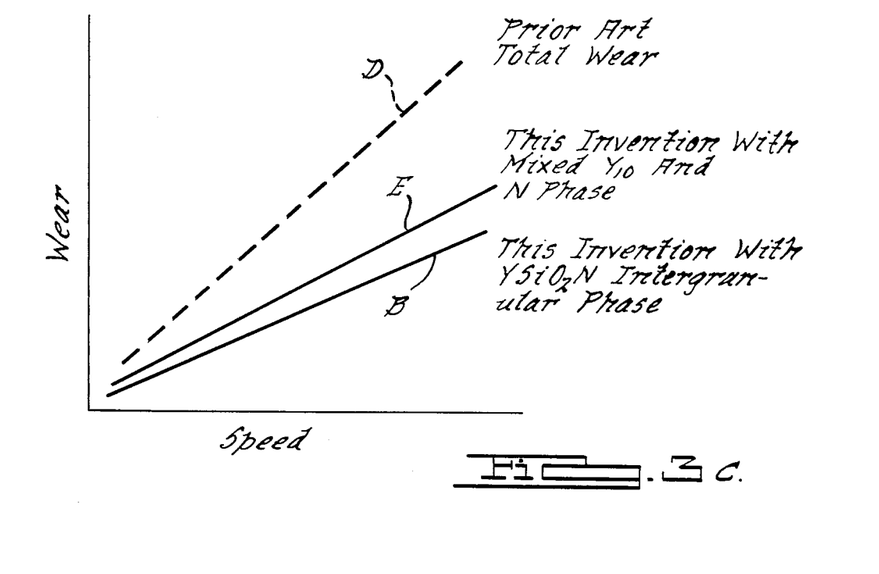

The resulting object, when shaped as a cutting tool and used to machine cast iron, exhibits decreased tool wear in the mechanical component (see FIG. 3b) due to a fine homogeneous microstructure devoid of visual mottling (see FIG. 2c) and in the chemical component (see FIG. 3c) due to a second phase crystallite consisting substantially of $Y_1SiO_2N$ encapsulated by a glass film.

Figure 1:
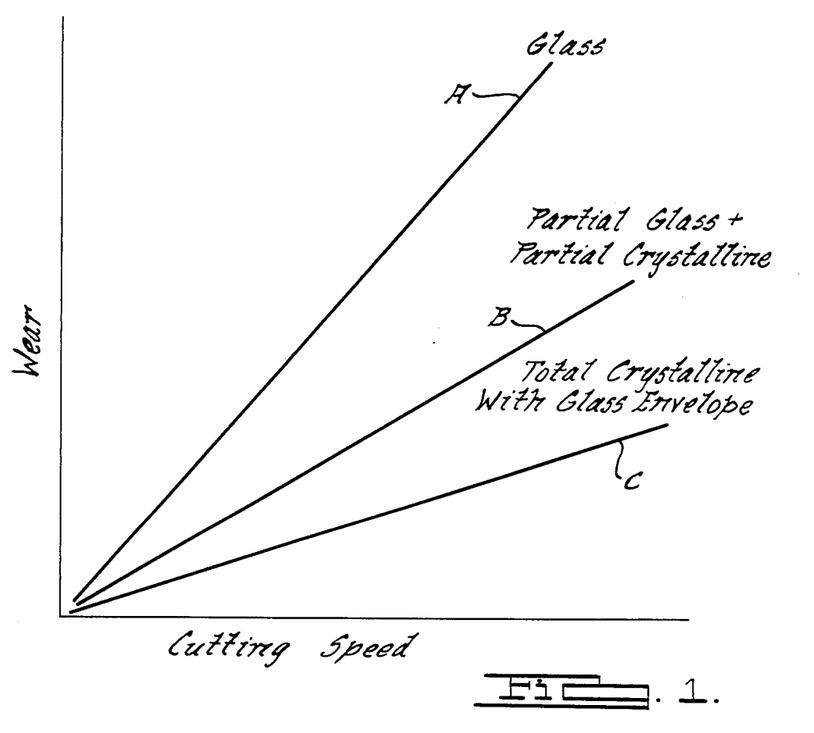
FIG. 1 is a graphical illustration of the chemical component of tool flank wear as a function of speed, comparing the improved wear characteristics of a crystalline versus a glass intergranular phase. Curve A was generated using hot pressed $Si_3N_4$ made from a mixture of 91% $Si_3N_4$, 8% $Y_2O_3$, and 1% $Al_2O_3$ with a glassy intergranular phase. Curve B was generated using hot pressed $Si_3N_4$ made from a mixture of 91% $Si_3N_4$, 8% $Y_2O_3$, and 1% $Al_2O_3$ that was selectively heat treated to partially recrystallize the glass into an oxynitride phase. Curve C was generated using the method described in this invention and represents total crystallization of the second phase except for a glass envelope.

Improved tool wear performance, as a function of cutting speed and chemical component degree of crystalline or glassy intergranular phase, is shown in FIG. 1.

The mottling in FIGS. 2a and 2b is due to the type of second phase present and due to selective volatilization of the second phase. Sections A and B of FIG. 2 illustrate the mottle porosity appearance of the prior art.

EXAMPLES

A series of 13 cutting tool samples were prepared and tested as to physical parameters and machining performance to illustrate how variations in processing and chemistry facilitate or deny obtaining the advantages of this invention. The results are summarized in Table I. Column 2 indicates whether the sample was prepared from silicon powder or silicon nitride powder.

Samples 1–3 were prepared in accordance with conventional prior art hot pressing practices wherein powder additives were introduced to $Si_3N_4$ powder ($SiO_2$ is present as a surface oxide on the starting $Si_3N_4$ powder and as a result of milling) and directly subjected to hot pressing in the powder form. The ingredients for these samples were based on a weight percentage of the silicon nitride mixture. The $Si_3N_4$ powder was 99% pure with a surface oxide ($SiO_2$) content of 0.7–3%. The $Y_2O_3$ powder was 99.99% pure. Milling was carried out prior to hot pressing by use of $Al_2O_3$ milling media until the average particle size was 2–7 microns. A wetting lubricant (methanol) was added during milling in a ratio of 1:1 with the silicon nitride powder. The mixture was then dried and screened (−100 mesh).

The ingredients for Samples 4–13 were based on a weight percentage of the silicon which is the base for the mixture. Samples 4–13 were prepared by placing the indicated proportions of silicon powder and oxide additives (see column 3) in a polypropylene nalgene jar containing Burundum cylinders as the grinding media (10,000 grams of the cylinders as a batch), each having 13/16 inch as length and diameter. The starting silicon was 98.5% pure with Fe 0.6 weight percent), Al (0.11 weight percent), and Mn (0.06 weight percent) as the major trace metal contaminants. All other trace metals were each less than 0.05 weight percent. The oxygen level of the starting silicon was 0.46 weight percent, carbon level 0.03 weight percent, and the sulfur level 0.002 weight percent. The starting silicon powder had an average particle size of 8 microns. The yttria used was 99.99% pure with an average crystal size of 438 Å and a surface area of 6.3 $m^2/gm$. The alumina used was 99.5% pure with an ultimate crystal size of 0.3–0.5 microns. The powder mixture was milled for 48 hours at a speed of 64 rpm and then separated from the grinding media by passing the powder mixture through a #10 mesh screen. The resulting powder was a uniform mixture of silicon powder and oxide additives reduced in particle size to an average of 4 microns. The oxygen level of silicon powder was increased to 1.6 weight percent, which corresponds to an $SiO_2$ content of 3.0 weight percent. The $Y_2O_3/SiO_2$ ratio was 7 after milling.

In Samples 4–13 a portion of the powder mixture (about 340 grams) was cold pressed at 1400 psi into 6 inch diameter discs or compacts, 0.5–0.6 inch in thickness. The compacts were then nitrided and reacted to form $Si_3N_4$ and second phases. The nitriding cycle employed is that described in the preferred mode.

The chemistry of the second phase material for each of the samples prior to hot pressing is characterized in column 4 of Table I. In Samples 4–13 the nitriding cycle produced, except for Sample 8, some proportion of second phase crystallites. Samples 4, 6, 7, 10, 12 and 13 contained mixed oxynitride crystallites with amorphous glass, not in envelope (as indicated by the designation "crystalline/glass"). The presence of a controlled amount of silicate glass envelope is indicated in column 6 for Samples 9 and 11.

All of the samples were hot pressed using the pressure and ultimate temperature indicated for the preferred embodiment herein. Pressing was carried out for 1–2 hours to obtain a complete conversion of alpha to beta $Si_3N_4$. The hot pressed object was then cooled to room temperature and analyzed for physical parameters. The discs were then diamond sawed into cutting tools of TNC-434 configuration and subjected to a machining operation involving continuous cutting of a simple cylindrical surface of a gray cast iron stator member having a hardness of 179–222 (brinnel scale with 0.003 kg. load). The presence of any visual mottle porosity is indicated in column 7. The number of pieces cut in a period of one hour and the flank wear on the cutting tool (measured in inches) is given in columns 8 and 9, respectively.

Sample 10, hot pressed at the higher temperature of 1750° C., had a mottled appearance characteristic of microporosity in the material. Areas of high concentration of yttrium were evident in Sample 5 showing microporosity as indicated by a heavy mottled appearance and nonuniformity. Samples 2, 3, 4, 6, 7 and 12 also showed a heavy mottled appearance.

Table I demonstrates that proper proportioning of the additives (oxynitride former and glass former) in a silicon mixture (such as 3–19% $Y_2O_3$, 0.4–5% $Al_2O_3$ and 1–3% $SiO_2$), and which mixture is then nitrided to and there was no visual mottle microporosity. The presence of the desired second phase crystallite before hot pressing provides for a fine, uniform microstructure in the hot pressed product and more effective cutting tool. Further improvements in oxidation resistance at 1000° C. take place.

TABLE I

| Sample | Base | wt. % of Additive in mixture | Form of Additive or Converted Additive Just Prior to HP | 2d Phase Chemistry Type of Crystallite in HP Object | Form of Chemical Component of Tool Wear in HP Object | Mottle Porosity Appearance | Machining Performance Flank Wear on Tool (>.03 is Failure) | Parts Machined (Stopped at 420) |
|---|---|---|---|---|---|---|---|---|
| 1 | $Si_3N_4$ | 5% MgO 1% $SiO_2$ | Unreacted Starting Material | None | All Glass | No | >.03 | 350 |
| 2 | " | 8% $Y_2O_3$ 1% $SiO_2$ | Unreacted Starting Material | $Y_{10}$ N Y | Crystalline/ Glass | Yes | " | 20 |
| 3 | " | 8% $Y_2O_3$ 1% $Al_2O_3$ 1% $SiO_2$ | Unreacted Starting Material | $Y_{10}$ N | Crystalline/ Glass | " | " | 400 |
| 4 | Si | 3.5% $Y_2O_3$ 0% $SiO_2$ (stripped) | N | N | Crystalline/ Glass | " | .018–.024 | 400 |
| 5 | " | 13% $Y_2O_3$ 2.5% $SiO_2$ | $Y_{10}$ Y N | $Y_{10}$ N Y | Crystalline | " | .011–.014 | 420 |
| 6 | Si | 4% $CeO_2$ 19% $ZrO_2$ 1% $Y_2O_3$ | PS Zirconia | $ZrO_2$ | Crystalline/ Glass | Yes | >.03 | 420 |
| 7 | " | 2% $Y_2O_3$ 1% $Al_2O_3$ 2% $SiO_2$ | N Y $Y_{10}$ | N $Y_{10}$ Y | Crystalline/ Glass | " | .010–.024 | " |
| 8 | " | 5% $Y_2O_3$ 6% $Al_2O_3$ 3% $SiO_2$ | Glass | Glass | Glass | No | >.03 | 250 |
| 9 | " | 12% $Y_2O_3$ 1.4% $Al_2O_3$ 2.6% $SiO_2$ | Y | Y | Crystalline/ Glass Envelope | No | .0075–.0085 | 420 |
| 10 | Si | Same as 9 HP at Higher Temp. | Y N $Y_{10}$ | $Y_{10}$ N | Crystalline/ Glass | Yes | .009–.020 | 420 |
| 11 | " | 19% $Y_2O_3$ 1% $Al_2O_3$ 2% $SiO_2$ | Y $Y_{10}$ | Y | Crystalline/ Glass Envelope | No | .0075–.011 | 420 |
| 12 | " | 25% $Y_2O_3$ 1% $Al_2O_3$ 3% $SiO_2$ | $Y_1Y_2O_3$ N | Y N | Crystalline/ Glass | Yes | >.03 | 400 |
| 13 | " | 8% $Y_2O_3$ 3.5% $Al_2O_3$ 2% $SiO_2$ | Y | Y | Crystalline/ Glass Envelope | No | .0075–.0085 | 420 | substantially fully react the ingredients, will cause the formation of desired crystallites and encapsulating glass envelope.

Samples 1–3 failed to start with a silicon base and thus failed to form totally crystalline oxynitrides and/or encapsulating glass envelope prior to hot pressing. Accordingly, these samples exhibited excessive wear equivalent to failure. Samples 4, 6, 7, 8 and 12 contained additives which were outside the essential ranges and exhibited flank wear well in excess of 0.01, mixed second phase, except for Sample 8 which was all glass. Sample 4 contained no glass former and no $SiO_2$. Samples 6 and 12 contained an excessive amount of oxynitride former. Sample 7 contained an inadequate amount of oxynitride former. Sample 8 contained an excessive amount of glass former. Sample 5 did not contain a glass former and although having a total crystalline but mixed second phase the tool wear was 0.012–0.014, which is in excess of that desired. Samples 9, 11 and 13 were fabricated in accordance with this invention and exhibited satisfactory tool flank wear of 0.01 or less, the crystalline second phase was enveloped in a glass film

We claim:

1. A method of making a reaction bonded, hot pressed silicon nitride comprising object having resistance to oxidation at high temperatures, comprising:

(a) forming a compact from a mixture of silicon with from 1 to 3% $SiO_2$ associated therewith, an oxynitride forming agent and from 0.4 to 5.0 %. alumina, said oxynitride forming agent and alumina being present in amounts to substantially fully react said silicon upon heating in nitrogen to convert the compact to essentially $Si_3N_4$ and oxynitride cyrstallites, encapsulated by a glass film;

(b) heating said compact in a nitriding atmosphere, without the use of pressure normally associated with hot pressing, to produce said converted compact, said converted compact having a size greater than and a density less than the final object to be formed; and (c) hot oppressing said body at a temperature equal to or below 1670° C. to produce a silicon nitride comprising object of required dimension and density useful for a cutting tool and consisting essentially of the chemistry in said converted compact.

2. The method as in claim 1, in which said converted compact contains no greater than 0.5% by weight free silicon and unreacted agents.

3. The method as in claim 2, in which said converted compact comprises 0.2–1% by weight of a protective amorphous silicate serving as said glass film.

4. The method as in claim 1, in which said oxynitride forming agent is present in said mixture in a molar percent of silicon in the range of 0.4–2.4.

5. The method as in claim 1, in which said oxynitride forming agent in said mixture consists substantially of $Y_2O_3$ in an amount comprising 3–19% by weight of said silicon, and said oxynitride crystallite in said converted compact is comprised of yttrium silicon oxynitride.

6. The method as in claim 1, in which said oxynitride forming agent is selected from the group consisting of oxides of rare earths.

7. The method as in claim 6, in which a portion of said rare earth oxide is replaced by zirconium oxide.

8. The method as in claim 6, in which said silicon is at least 98% pure with less than 1.5% by weight metal contaminants and less than 0.05% by weight carbon.

9. The method as in claim 1, in which said converted compact contains 2.9–14.4% by weight oxynitride crystallites.

10. The method as in claim 1, in which said glass film is 8–10 angstroms thick.

11. The method as in claim 1, in which the chemistry of said mixture is proportioned to form an increased amount of the $Y_1SiO_2N$ phase crystallite in said converted compact thereby reducing microporosity associated with mixed phases or with the presence of $Y_{10}$ phase, improving the diffusion coefficient of said glass film.

12. The method as in claim 11, in which said mixture contains a ratio of ingredients of two parts $Y_2O_3$, one part $SiO_2$, and one part silicon.

13. The method as in claim 1, in which said mixture consists of 3–19% $Y_2O_3$, 0.4–5% $Al_2O_3$, 1–3% $SiO_2$, and the remainder essentially silicon.

14. The method as is in claim 13, in which said $Y_2O_3$ and $Al_2O_3$ have a purity respectively of at least 99.9% and 99.5%.

15. The method as in claim 1, in which the oxynitride forming agent is present in an amount to constitute a weight ratio of oxynitride forming agent to $SiO_2$ of 1.1–6.4.

16. The method as in claim 1, in which the heating step (b) is carried out to maintain a substantially constant nitrogen content in said atmosphere and thereby control the exothermic reaction of said heating.

17. The method as in claim 13, in which in the converted compact of step (b) the N-melilite oxynitride phase ($Y_2O_3.Si_3N_4$) is present in an amount no greater than 0.5% by weight of the body.

18. A method of making a reaction bonded, hot pressed silicon nitride comprising cutting tool which has increased oxidation resistance at 1000° C., comprising the steps of:
  (a) forming a compact from a mixture of silicon, $SiO_2$, $Y_2O_3$ and a glass forming oxide selected from the class consisting of the oxides of magnesium, iron, calcium and chromium reactive with $SiO_2$ and $Y_2O_3$ to form upon heating a controlled amount of a protective amorphous silicate glass, said $Y_2O_3$ being present in said mixture in an amount of 3–19% by weight of said silicon, said glass forming oxide being present in an amount of at least 0.4 and up to 1.0% by weight of said silicon, said $SiO_2$ being present in an amount of 1–3% by weight of said silicon, and said mixture having a $Y_2O_3/SiO_2$ ratio of 1:1–6:4;
  (b) heating said compact in a nitriding atmosphere, to product a silicon nitride comprising body consisting of $Si_3N_4$, at least one yttrium silicon oxynitride present in an amount of 3–15% by weight of said body and dispersed throughout, up to 0.5% free silicon and residual $Y_2O_3$, 1% or less silicate glass encapsulating said yttrium silicon oxynitride, at lease 60% of said $Si_3N_4$ being in the alpha form, said body having a size greater than and a density less than said tool;
  (c) hot pressing said body at a temperature equal to or below 1670° C. to produce a silicon nitride comprising cutting tool of required dimension and density consisting essentially of the chemistry developed previously during said heating step.

19. The method as in claim 18, in which said mixture is proportioned to form yttrium silicon oxynitride comprised of at least 80% by weight of $Y_1SiO_2N$ during heating in the temperature range of 1600°–1650° C. for at least six hours.

20. The method as in claim 18, in which said hot pressing is carried out at an ultimate temperature of 1200°–1650° C. in an environment uncontrolled as to inertness.

21. The method as in claim 18, in which the average particle size for at least 50% of said mixture is about 3.0 microns.

22. The method as in claim 18, in which said hot pressing ultimate temperature is in the range of 2500°–3000° F. (1371°–1650° C.) and the ultimate pressure is in the range of 3600–3800 psi.

23. The method as in claim 22, in which said ultimate pressure and temperature is maintained for a period of 0.25–3.0 hours.

24. The resulting from the practice of the method of claim 18, said object being characterized by the presence of 1–7.5% by weight silicon oxynitride crystallites, a hardness of 88.5–92.0 on the 45-N scale, and a density of 3.2–3.4 gm/cm 25. The object as in claim 24, in which said object additionally is characterized by a fracture strength of about 90,000 psi at 1200° C. in air in a 4-point bend test and an oxidation resistance that prevents weight pickup by the tool after 450 hours in air at 1000° C.

26. The object as in claim 25, in which the object has no visual mottle microporosity.

27. A method of making a silicon nitride comprising body useful as a starting material in the hot pressing of objects, comprising the steps of:
  (a) forming a compact from a mixture of silicon with from 1 to 3% $SiO_2$ associated therewith, an oxynitride forming agent, and a glass forming agent, said oxynitride and glass forming agents being present in said mixture in an amount to substantially fully react said silicon upon heating in nitrogen to convert the compact to essentially $Si_3N_4$, oxynitride crystallites encapsulated by 0.2–1% silicate by weight, with up to 0.5% by weight free silicon and unreacted agents; and
  (b) heating the compact in a nitriding atmosphere, without the use of pressure normally associated with hot pressing, to produce said converted compact consisting of $Si_3N_4$, at least one dispersed silicon oxynitride crystallite phase encapsulated by 0.2–1% by weight of the silicate, and up to 0.5% by weight free silicon and unreacted agents.

28. The method as in claim 27, in which said oxynitride forming agent consists of $Y_2O_3$ in an amount of 3–16% by weight of the silicon, and said glass forming agent consists of $Al_2O_3$ in an amount of 0.4–5.0% by weight of the silicon, the ratio of $Y_2O_3/SiO_2$ in said mixture being 1:1–6.4.

29. The method as in claim 27, in which heating in nitrogen is carried out with a nitrogen demand cycle to an ultimate temperature of 1090°–1430° C. (2000°–2600° F.).

30. The body resulting from the practice of claim 27, in which said $Si_3N_4$ has at least 60% by weight in the alpha form and said yttrium silicon oxynitride consists substantially of $Y_1SiO_2N$.

31. The body as in claim 30, characterized by a density of at least 3.25 gm/cm$^3$.

32. The method as in claim 18 wherein said heating in step (b) is conducted with the use of pressure normally associated with hot pressing.

33. The method as in claim 18 wherein said heating in step (b) is conducted without the use of pressure normally associated with hot pressing.

34. A method of making a reaction bonded, hot pressed silicon nitride comprising object having resistance to oxidation at high temperatures, comprising:
  (a) forming a compact from a mixture of silicon with from 1 to 3% $SiO_2$ associated therewith, an oxynitride forming agent, present in an amount to substantially fully react said silicon upon heating in nitrogen to convert the compact to essentially $Si_3N_4$ and oxynitride crystallites, and a glass forming agent selected from the group consisting of MgO, $Fe_2O_3$, CaO and $Cr_2O_3$ in an amount from 0.4–1.0% sufficient to encapsulate said oxynitride crystallites by a glass film;
  (b) heating said compact in a nitriding atmosphere to produce said converted compact, said converted compact having a size greater than and a density less than the final object to be formed; and
  (c) hot pressing said body at a temperature equal to or below 1670° C. to produce a silicon nitride comprising object of required dimension and a density useful for a cutting tool and consisting essentially of the chemistry in said converted compact.

35. A method of making a reaction bonded, hot pressed silicon nitride comprising cutting tool which has increased oxidation resistance at 1000° C., comprising the steps of:
  (a) forming a compact from a mixture of silicon, $SiO_2$, $Y_2O_3$ and $Al_2O_3$ reactive with $SiO_2$ and $Y_2O_3$ to form upon heating a controlled amount of a protective amorphous silicate glass, said $Y_2O_3$ being present in said mixture in an amount of 3–19% by weight of said silicon, said $Al_2O_3$ being present in an amount of at least 0.4 and up to 5% by weight of said silicon, said $SiO_2$ being present in an amount of 1–3% by weight of said silicon, and said mixture having a $Y_2O_3/SiO_2$ ratio of 1:1–6:4;
  (b) heating said compact in a nitriding atmosphere to produce a silicon nitride comprising body consisting of $Si_3N_4$, at least one yttrium silicon oxynitride present in an amount of 3–15% by weight of said body and dispersed throughout, up to 0.5% free silicon and residual $Y_2O_3$, 1% or less silicate glass encapsulating said yttrium silicon oxynitride, at lease 60% of said $Si_3N_4$ being in the alpha form, said body having a size greater than and a density less than said tool;
  (c) hot pressing said body at an ultimate temperature of 1200°–1650° C. in an environment uncontrolled as to inertness to produce a silicon nitride comprising cutting tool of required dimension and density consisting essentially of the chemistry developed previously during said heating step.

36. The method as in claim 35 wherein said heating in step (b) is conducted with the use of pressure normally associated with hot pressing.

37. The method as in claim 35 wherein said heating in step (b) is conducted without the use of pressure normally associated with hot pressing.

38. The method as in claim 35, in which said mixture is proportioned to form yttrium silicon oxynitride comprised of at least 80% by weight of $Y_1 SiO_2N$ during heating in the temperature range of 1600°–1650° C. for at least six hours.

39. The method as in claim 35, in which the average particle size for at least 50% of said mixture is about 3.0 microns.

40. The method as in claim 35, in which said hot pressing ultimate temperature is in the range of 2500°–3000° F. (1371°–1650° C.) and the ultimate pressure is in the range of 3600–3800 psi.

41. The method as in claim 40, in which said ultimate pressure and temperature is maintained for a period of 0.25–3.0 hours.

42. The object resulting from the practice of the method of claim 36, said object being characterized by the presence of 1–7.5% by weight silicon oxynitride crystallites, a hardness of 88.5–92.0 on the 45-N scale and a density of 3.2–3.4 gm/cm.

43. The object as in claim 42, in which said object additionally is characterized by a fracture strength of about 90,000 psi at 1200° C. in air in a 4-point bend test and an oxidation resistance that prevents weight pickup by the tool after 450 hours in air at 1000° C.

44. The object as in claim 43, in which the object has no visual mottle microporosity.

* * * * *